(No Model.)

J. A. KEMPS & E. E. FOY.
Skimmer.

No. 236,821.        Patented Jan. 18, 1881.

Witnesses.
A. Ruppert.
C. M. Connell.

J. A. Kemps
E. E. Foy
Inventor.
Holloway & Blanchard
Att'ys

UNITED STATES PATENT OFFICE.

JAMES A. KEMPS, OF SAVANNAH, AND EDWARD E. FOY, OF EGYPT, GEORGIA.

SKIMMER.

SPECIFICATION forming part of Letters Patent No. 236,821, dated January 18, 1881.

Application filed December 8, 1880. (No model.)

*To all whom it may concern:*

Be it known that we, JAMES A. KEMPS and EDWARD E. FOY, citizens of the United States, residing, respectively, at Savannah, in the county of Chatham and State of Georgia, and Egypt, in the county of Effingham and State of Georgia, have invented certain new and useful Improvements in Skimmers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to improvements in skimmers for the collection and removal of scum and other foreign substances which rise to the surface of cane-juice, sorghum-juice, and other saccharine matter while being evaporated or converted into sugar or sirup; and the objects of our improvements are, first, to provide a cover for evaporating pans, kettles, and other devices in which saccharine substances are to be evaporated, which has its central portion raised some distance above its general level and provided with an aperture through which the scum and other foreign substances can rise and flow into a series of skimmers arranged around said aperture; second, to provide a series of readily-removable skimmers having perforated bottoms; and, third, certain combinations of the parts of which the apparatus is composed. We attain these objects by the device illustrated in the accompanying drawings, in which—

Figure 1:
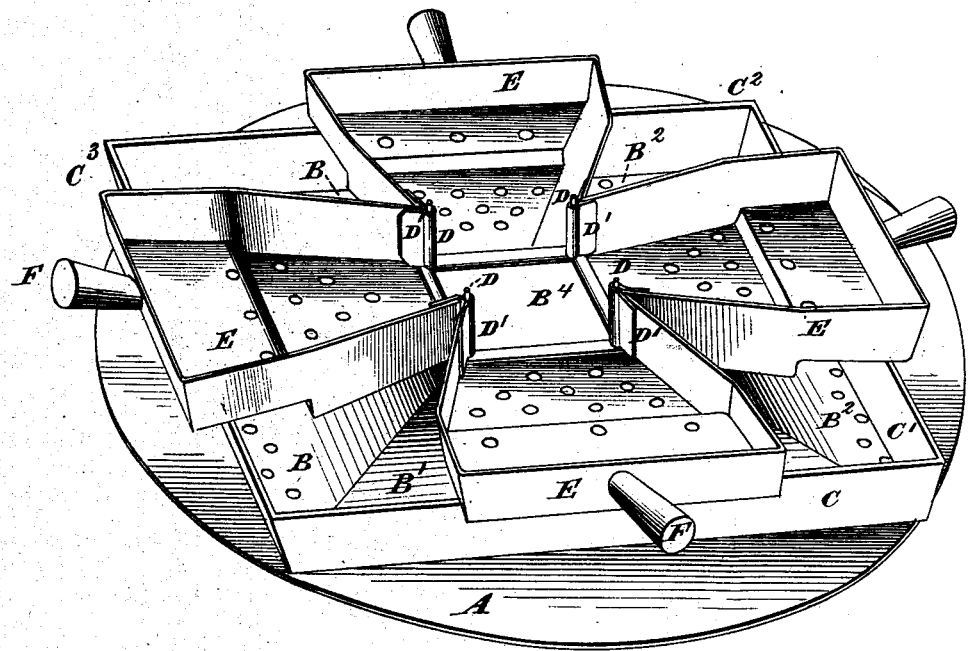
Figure 2:
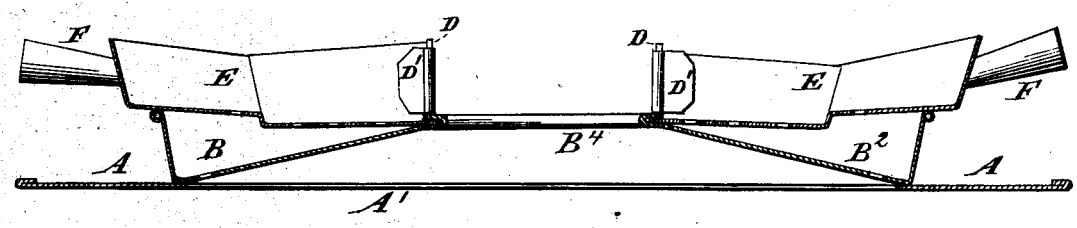

Figure 1 is a perspective view, showing the construction of the cover, the aperture in the center thereof, the central raised portion, the flanges upon which the outer ends of the removable skimmers rest, and apertures for the return of any juice or sirup that the scum may contain to the evaporator; and Fig. 2 is a central vertical sectional elevation, showing the parts above enumerated, and also the method of holding in position the inner ends of the skimmers and of directing the scum and other matter into them.

Similar letters refer to similar parts in both views.

In constructing skimmers of this type there is provided a cover, of circular form, or of any other form that will adapt it to the evaporator or kettle upon which it is to be used, it being, by preference, made of sheet metal, and when used upon pans or kettles of small diameter it may be made of tin. This cover or portion of the cover is designated by the letter A, it having its central portion cut away, as shown in Fig. 2 of the drawings. To the edges of the aperture A', formed as above stated, there are soldered or otherwise secured plates B B' $B^2$ $B^3$, which are to be substantially of the form shown at B', Fig. 1, in order that when they are secured to the portion A of the cover they shall leave at the center thereof an aperture, $B^4$, which may be of any desired form and dimensions, according to the capacity of the evaporator.

For the purpose of elevating the parts surrounding the aperture $B^4$ above the surface of the liquid in the evaporator, and for directing to said aperture all of the scum and other foreign substance that may rise to the surface of such liquid, the plates B, B', $B^2$, and $B^3$ are placed at an angle to the plane of the portion A of the cover, as shown in Fig. 2.

Upon the upper surface of that portion of the cover designated by the letter A there are placed four flanges, C, C', $C^2$, and $C^3$, which, being joined together at their ends, constitute an upwardly-projecting flange, the upper surface of which is, by preference, slightly higher than the upper surface of the parts surrounding the aperture $B^4$, the outer portions of a series of skimmers or scum-retainers (soon to be described) resting upon it. At the four corners of the aperture $B^4$ are placed studs or pins D, which support and keep in position angularly-formed pieces of metal D', into which flanges formed upon the upper surfaces of the series of skimmers E enter, and by which the inner ends of said skimmers are held in position.

For the purpose of directing the scum and other substance into the skimmers, and for preventing the juice from leaking past their lower surfaces, there is formed upon the inner ends of the plates B, B', B², and B³ a flange or recess, as shown in Fig. 2, into which the inner edges of the skimmers enter, the upper portion of said flange and the pieces D' directing the scum well into the skimmers.

The form of the skimmers and their arrangement with reference to the other parts of the cover is clearly shown in Fig. 1 of the drawings, where it will be seen that they are provided with perforated bottoms, the object of which is to permit any juice or sirup that may be carried into them by the scum or other substance to flow through onto the raised surface of the plates underneath, and so, through apertures therein, into the evaporator or kettle containing the juice which is being treated. These skimmers are also provided with flanges, which rise from their upper surfaces and serve to retain the scum and other substances which enter the skimmers, as above stated, until said skimmers are removed and emptied by the operator. They are further provided with suitable handles F, by which, when it is necessary to empty them, they can be readily removed and replaced.

This form of skimmer has the advantage of being automatic and constant in its operation, as when one of the parts are removed for being emptied all of the others continue to perform their functions uninterruptedly; and a further advantage is that when it becomes necessary to cleanse the skimmers it can be done by simply removing them, emptying them of their contents, and then plunging them into a tub of water, which will have the effect to remove all of the matter which adheres to them.

Having thus described our invention, what we claim, and desire to secure by Letters Patent, is—

1. A cover for pans, kettles, and other vessels in which saccharine juices are evaporated, having a raised central portion provided with an aperture, the arrangement of the parts being substantially such as herein described, whereby the scum and other foreign substances rising upon the material being treated are collected and directed to a common point and delivered into skimmers, substantially as described.

2. The removable skimmers E, provided with perforated bottoms and an offset or shoulder for holding them in position, substantially as described.

3. In a cover for pans, kettles, and other vessels for evaporating saccharine juices, the combination of the plate A, central raised portions, B, B', B², and B³, the latter forming an aperture through which the scum and other foreign substance rise, and a series of removable skimmers, E, the parts being arranged substantially as and for the purpose specified.

4. The combination of the skimmers E, supporting studs or pins D, and plates D', substantially as and for the purpose set forth.

In testimony whereof we affix our signatures in presence of two witnesses.

JAMES A. KEMPS.
EDWARD E. FOY.

Witnesses:
CHAS. W. LUFBURROW,
T. P. RAVENEL.